US012667885B2

(12) United States Patent
Stroud et al.

(10) Patent No.: US 12,667,885 B2
(45) Date of Patent: Jun. 30, 2026

(54) AUTOGENIC CANISTER FOR METAL RECYCLING BY INDIRECT HOT EXTRUSION

(71) Applicants: Adam Stroud, Longview, TX (US); Mark Bordelon, Houston, TX (US)

(72) Inventors: Adam Stroud, Longview, TX (US); Mark Bordelon, Houston, TX (US)

(73) Assignee: LeTourneau University, Longview, TX (US)

( * ) Notice: Subject to any disclaimer, the term of this patent is extended or adjusted under 35 U.S.C. 154(b) by 391 days.

(21) Appl. No.: 18/422,931

(22) Filed: Jan. 25, 2024

(65) Prior Publication Data

US 2024/0316632 A1 Sep. 26, 2024

Related U.S. Application Data

(60) Provisional application No. 63/441,284, filed on Jan. 26, 2023.

(51) Int. Cl.

| | |
|---|---|
| ***B22F 3/20*** | (2006.01) |
| ***B21C 23/21*** | (2006.01) |
| ***B21J 5/00*** | (2006.01) |
| ***B22F 5/12*** | (2006.01) |
| ***B22F 8/00*** | (2006.01) |
| *B21C 35/00* | (2006.01) |
| *B21J 13/14* | (2006.01) |
| *B30B 11/22* | (2006.01) |
| *B30B 15/28* | (2006.01) |

(52) U.S. Cl.

CPC .............. *B22F 3/20* (2013.01); *B21C 23/218* (2013.01); *B21J 5/00* (2013.01); *B22F 5/12* (2013.01); *B22F 8/00* (2013.01); *B21C 35/00* (2013.01); *B21J 13/14* (2013.01); *B22F 2003/208* (2013.01); *B22F 2301/35* (2013.01); *B22F 2998/10* (2013.01); *B30B 11/22* (2013.01); *B30B 15/28* (2013.01)

(58) Field of Classification Search

CPC .... B22F 3/003; B22F 3/20; B22F 5/12; B22F 8/00; B22F 2003/208; B22F 2301/35; B22F 2998/10; B21C 23/218; B21C 35/00; B21J 5/00; B21J 13/14; B30B 11/22; B30B 15/28

USPC ................................................ 72/255, 273.5

See application file for complete search history.

(56) References Cited

U.S. PATENT DOCUMENTS

| | | | | |
|---|---|---|---|---|
| 3,530,702 A * | 9/1970 | De Ridder | B21C 23/218 72/263 |
| 4,647,426 A * | 3/1987 | Fiorentino | B30B 15/0017 419/41 |
| 2014/0338415 A1* | 11/2014 | Muschalik | B21C 26/00 72/255 |

* cited by examiner

*Primary Examiner* — Alexandra M Moore

(74) *Attorney, Agent, or Firm* — Gary DeBoer

(57) ABSTRACT

The autogenic canister for metal recycling invention delivers a metal solid from a mixture of metal revert, turnings, chips, sponge, granules, solids, and powders in an automatically generated vacuum sealed canister. The method of delivery involves an indirect extrusion process that incorporates a sealing device around a solid compaction ram. Clean metal particulates are sealed under vacuum within the repeatedly reforming canister. The process avoids common extrusion defects and produces extrusion products using less energy than melting based recycling processes and has fewer processing steps. The invention has environmental and economic advantages over the prior art in solid state recycling of metals.

15 Claims, 17 Drawing Sheets

AUTOGENIC CANISTER FOR METAL RECYCLING BY INDIRECT HOT EXTRUSION

CROSS-REFERENCE TO RELATED APPLICATION

The present application claims priority to, and the benefit of, U.S. Provisional Application No. 63/441,284, which was filed on Jan. 26, 2023, and is incorporated herein by reference in its entirety.

FIELD OF THE INVENTION

The present invention relates to machinery and specific attributes recycling particulate metal by deformation at high temperature in a vacuum environment, and more specifically to containers to contain the particulate metal material and vacuum environment and a method of coupling with a machine architecture.

BACKGROUND

Various forms of melting and casting under a vacuum are significant steps in the recycling of numerous useful metals such as nickel alloys, titanium, and some iron-based metals. These processes are very energy intensive, costly, and typically require numerous subsequent hot deformation steps to produce desired geometric forms and wrought microstructures commonly desired in wire, bar, and billet.

Solid-state deformation (SSD) methods represent a potential means of producing these same products at or close to finished form with less energy required given the absence of melting and size reduction to refine cast microstructures. In these methods particulate metals, such as chips, turnings, granules, or flakes, are deformed below the melting temperature to consolidate the mass into an effectively fully dense material with wrought microstructure. Of these various methods, those which imparted significant plastic strain, such as hot extrusion based processes, prove more effective at producing homogeneous wrought microstructures from course or mixed microstructure starting material as would be expected from chips and turnings.

In order for the metals to bond together under compression, oxides cannot be present on the outer surfaces of the particles. These form when heating occurs while exposed to gases or atmosphere. The dominant method of protecting these materials is to seal them within a canister Alternative methods have been sought to replace this multiple step process of casting and hot deformation reducing, for raw mill stock production. One pursuit has been around solid-state deformation (SSD) of powder or machined chips into a compaction to form a solid specimen of equivalent quality to traditionally produced mill products. Sealing material in a vacuum environment within an airtight canister while subjected to a hot deformation process is an effective method of enabling solid state consolidation of metal particulate. However, the cost of manufacturing and steps associated with removing the canister have been detrimental in the adoption of this process as a low-cost recycling method. As such the mitigation of the cost of the manufacturing of a canister and the cost to remove the canister following consolidation is a major advantage to the economics of a solid-state recycling process. Additionally, a number of process attributes also enable for a SSD processes to robustly deliver usable mill product directly from clean but unprocessed revert or scrap chips. These parameters include fully maintain vacuum environment around chips until compaction, isolation from contaminants prior to compaction, working temperature aligned with the hot working temperature of the material, and a large, imparted strain. Regarding, the introduction of atmosphere, even momentarily before consolidation, can cause oxide formation or gas entrapment between metal particles. As a result, first, incomplete inter-particulate bonding or retained voids can remain. Second, any non-gaseous contaminants that can reach the particulate material have the potential to become entrapped in the material as it consolidates and compromising quality. Third, the utilization of deformation within hot working temperature zones, as with standard metalworking processes, avoids negative material effects the compromise material properties. Forth and finally, the imparting of significant strain separates processes that can refine particles that do not have ideal microstructure instead of just consolidating a finely granulated powder as is the case for powder metallurgy processes. A recycling process should be able to accommodate a broad spectrum of particulate sizes and refine the microstructure of particulate with undesirable microstructures. These metrics are presented to clearly highlight the advantages of the present invention over the prior art in solid state deformation capable of recycling.

In prior arts U.S. Pat. Nos. 4,040,162, 3,611,546, 3,723,109, 3,824,097, 3,899,821, EP 2 785 482 B1, U.S. Pat. No. 8,303,289, US 2017/0 202 735, U.S. Pat. Nos. 7,942,308, 11,117,190, and 7,344,675 all utilized single use canisters that do not persist after the process. They also have to be separated from the material within them after the process. These prior art fail to address the foundational economic limiters for use as a recycling process.

One prior art aimed to case in the subsequent removal of the consumable canister. In patent GB 2,062,685 a canister was manufactured of a material that melts at a temperature non-detrimental to contained material so that the canister can be removed by a melting process and its material recycled. This, however, does not address the cost of manufacture of the canister and requires an additional heat treatment cycle to remove the canister.

In prior art U.S. Pat. No. 4,094,672 a method of removal of a sealed canister from a compaction utilizing an internal gas pressure to expand the canister from the consolidated material was presented. This allowed for the reuse of the manufactured canister. However, in this invention a distinct parting and removal operation is required. Additionally, the canister must initially be manufactured for use.

One prior art sought to eliminate the manufacture and removal of consumed canister by making a canister that persists unaltered through a consolidation process. In U.S. Pat. No. 4,647,426 a machined canister body and machined lower body accepts a sealing disk to enclose a material within a vacuum for consolidation and/or extrusion. While the main body of the of the canister can be reused through multiple cycles with this invention, the seal disk is still consumable and must be replaced. The extrusion also results in a discard or “butt” that represents a material loss following the extrusion, representing further material inefficiency. In addition, the machined canister has a manufacturing cost that must be amortized over its useful life, whatever that may be. In addition to the efficiency metrics, the prior art fails to maintain vacuum continuously through consolidation as the seal disk must be sheared on approach. While the art does provide a sequence within the hot deformation for removal of the consolidated material without leaving the equipment, the pushing material through a canister during extrusion or ejection poses issues at the interface. The consolidation of metal within a metallic canister is going to tend to want to stick together and be difficult to remove unless parting agents or lubricants are used. In the prescribed scenario of lubricant use the likely contamination of the compact would be expected from these materials or a difficult ejection or extrusion would be expected.

One prior art aims to eliminate the cost and losses of a canister's removal by creating a canister that is substantially matching chemistry and becomes part of the final product. In patent application US 2017/0233850 A1 titanium sponge was vacuum sealed inside a canister made of commercially pure titanium metal sheet with matching chemical composition. The canister was then deformed to yield a structure with core material that has increased density. Because the materials match chemically the removal of the canister is no longer required as with prior art, thus improving the yield. The canister is fully consumed and must be remanufactured each time. This is an improvement over other consumed canisters as it is not simply discarded but sold as part of the finished product. However, the construction costs of making the canister for each piece are appreciable and detract from the cost efficiency of the delivered bulk solid.

In the current invention the extrusion remnant of the novel indirect extrusion architecture forms the body of a canister for the next operation. This can be repeated indefinitely as the canister is reforged each cycle. The canister body remnant form a prior extrusion must be rescaled by a joining process with a lid and joining material of substantially matching chemistry that become part of the canister and compaction during compaction and extrusion. As such, all constituent metal ends up residing in the canister body or as part of the extruded material. This invention has no wasted metal material as even the extrusion discards, common in all extrusion processes, are contained within the canister body and simply reused in the next extrusion. In addition, this invention meets the goals of maintained vacuum through consolidation, avoidance of solid contamination, high level imparted strain, and imparting work within hot working zones. The details and specifics of the current invention are presented below in greater depth.

BRIEF SUMMARY OF THE INVENTION

The present invention delivers on the aim of generating a fully dense or near fully dense metal solid from metal revert, turnings, chips, sponge, granules, solids, powders or mixtures thereof without the necessity for costly melting practices or granulation refinement beyond cleaning. Similar to powdered metallurgy processes it applies deformation and pressure at high temperatures within a vacuum sealed canister to yield substantially fully dense material. However, the present invention aims to address the limitations observed, particularly when working with courser starting input material such as turnings or machining chips. Specific limitations addressed are high material and manufacturing cost of consumable vacuum sealed containers and insufficient deformation to refine remnant microstructural artifacts from input material such as course or mixed microstructures, irregular shaped pieces, or minor oxide films on particulate surfaces.

The method of delivering this invention is through the implementation of a vacuum canister that bonds with the contained input fill material during consolidation but as the specialized indirect extrusion process continues to shape the contained material and finishes, a new starting canister body is geometrically re-formed. Since the method automatically regenerates a new starting canister the term autogenic canister is used. This extrusion process incorporates a sealing device, sometimes called a ring or retainer, around a solid compaction ram, sometimes called a punch or die, or an extrusion ram, sometimes also called a punch or die, with at least one extrusion orifice. Clean metal particulate is sealed under vacuum, within the repeatedly reforming canister, by a lid, sometimes called a disk or cover, of any suitable starting geometry, and is attached to the autogenic canister body by a suitable means—which is preferably a welding process. The chemistry of the canister body, lid, attachment material, and recycled metal particulate are of substantially equivalent chemistry. During compaction and extrusion all mentioned bodies metallurgically bond into one body or mass and begin extruding through the orifice of the extrusion ram. The indirect extrusion methodology does not complicate bonding to the canister, unlike the significant surface shearing of direct extrusion where a ram pushes material through a container toward an orifice on the opposite side of the container. At the maximum travel of the extrusion ram, the material remaining within the tooling matches the starting geometry of the canister body, with the exception of extrusion parting and lid addition. As a result, all material is either extruded out as finished material or formed into the canister body for the next cycle of the process. No specific manufacturing, besides the lid attachment, is required with each cycle and no material is lost with the process. Even the sealing lid and attachment material end up in either the autogenic canister body or the extrusion. Additionally, the lack of metal losses of the process, enables a thicker and more durable canister body to be used without negative economic impacts to the process. This results in a more durable canister that is less susceptible to puncture or loss of vacuum resulting from handling throughout the process.

Since canister exterior surfaces do not find their way onto extrusion surfaces and the lid is fully compacted and bonded to interior material before being extruded, common extrusion canister folding or wrinkling surface defects, that must be removed in other technologies, are avoided as well as their associated financial losses. In this embodiment, the extruded material is severed by an acceptable parting means to allow removal of extrusion and autogenic canister separately. In this embodiment, the remaining extrusion end is either sealed below the canister lid or the lid is sealed around the protruding end, depending on the desired placement of the cut. The lid affixed to re-establish the vacuum chamber can be flat, have any desirable curvature, or have constant or varying thicknesses.

The indirect extrusion architecture that results in this autogenic canister body, would use a tapered container walls, supporting solid container base, and a sealing structure around the advancing ram(s) from the front of the container. The sealing structure is an advancing carriage that contacts with the container structure and blocks material from advancing from the gap between the ram and the container, thus constricting the orifice, or multiple thereof, on the face of the ram as the only means of outflow, or extrusion, of the contained material. The sealing structure may be advanced by any suitable force supplying mechanism and held against the container by the advance mechanism or any suitable locking mechanism, during the press stroke(s). The tapered container would allow the canister to be re-inserted into the liner structure when reheated without removal of material from the outer surface to create a clearance fit, as would be required with simple cylindrical structures.

One variant of the present invention lies in the method of parting the indirect extruded material from the canister remnant after the indirect extrusion stroke. In contrast to the prior embodiment, an alternative method for severing the extruded material from the canister is to utilize a shear tool from the back or underside of the canister. It is acknowledged that this invention can be carried out either vertically or horizontally without incident, but is depicted oriented vertically for consistency. This tool pushes the extrusion upward while shearing the base material of the autogenic canister holding it to the canister. Once sheared, the extrusion can be pulled free of the canister. This practice does result in a hole in the bottom of the canister that must also be sealed along with the addition to a lid on the top of the canister.

A variant of the present invention involves the use of a lid structure with increased thickness corresponding to the orifice(s) on the main ram to increase compacting pressure immediately prior to breakthrough, or beginning of outflow of material in the extrusion.

Another variant of the prior embodiments involves the use of a solid face ram without an exit orifice to force compaction of material contained within the canister prior to the extrusion process. The solid ram may have a flat face or any desired geometric profile to sculpt the compacted particulate within the autogenic canister prior to the extrusion initiation. This compaction step occurs to the filled and sealed canister prior to extrusion. This compaction can occur within the same container structure that extrusion will occur in or it can take place in a completely separate set of tooling or press equipment. This compaction will also be done at an elevated temperature but may be at a different set point temperature that the extrusion step, which will be within the acknowledged hot work temperature zones of the material being recycled. It may also be performed during the same heating cycle as the extrusion or re-heating may be done prior to the extrusion step.

The resulting extrusion material are substantially fully dense with refined wrought microstructure and high-quality surfaces. The automatic formation of the canister body required for the recycling process avoids significant fabrication costs, removal costs, and material losses associated with the canister. Additionally, this process requires less energy than melting based recycling process, has fewer processing steps, and does not produce metal losses. As such the present invention has an environmental and economic advantage over all prior art in solid state recycling of metals.

BRIEF DESCRIPTIONS OF THE DRAWINGS

DETAILED DESCRIPTION OF THE PRESENT INVENTION

Figure 1:
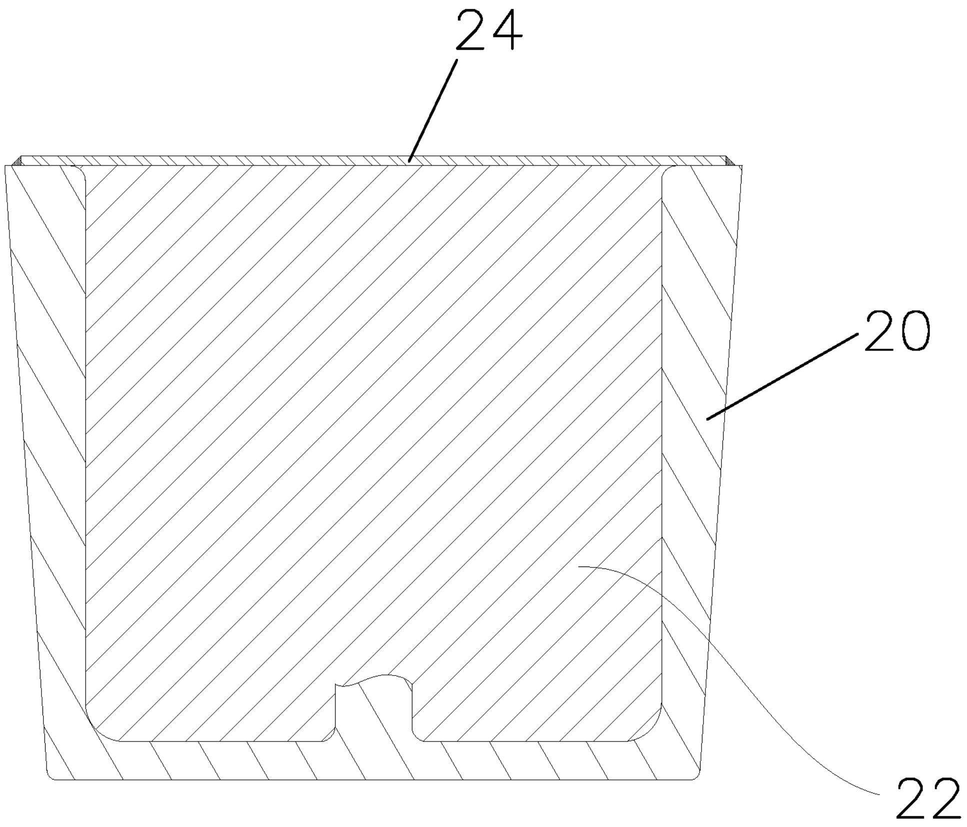
FIG. 1 is a section view of the least complex embodiment of an autogenic canister assembly.

The description in this embodiment is for illustrative purposes and is not intended to be restrictive to the scope in any way. As depicted in FIG. 1, the introduction of a canister body, with specific geometric qualities and coupled with a specialized indirect extrusion process, delivers the desirable state retaining a canister structure that is suitable for reintroduction into another extrusion process iteration, as described. The implication being that the autogenic canister 20 is regenerated in the indirect extrusion process and forms the basis for a filled canister recycling process. The autogenic canister lid 24 and the loose or partially compacted particulate material being recycled 22 are introduced with each solid-state recycling process. The material of the autogenic canister lid 24 and particulate material 22 fully pass through to either the autogenic canister 20 body or the recycled extrusion. This mitigates material losses associated with consolidating material within a canister and significantly reduces the cost imparted to the consolidated material within.

The material of the autogenic canister body 20 and lid 24 is to be substantially equal chemistry to the particulate material 22 filling the canister in order to deliver a homogenous chemistry when the autogenic canister lid 24 or portions of the autogenic canister 20 pass through with the extrusion. Once filled with revert, powder, sponge, solids, or mixtures thereof, the air around the filling particulate material 22 is evacuated and a autogenic canister lid 24 is scaled on the top rim, typically through welding, in order to maintain a vacuum around the material, within the autogenic canister 20 during the heating and extrusion process. Prior partial compaction of filling particulate material 22 may be performed to increase metal content within the autogenic canister 20 so long as compaction does not partition the voids surrounding the particulate material 22 prior to gas evacuation. After partitioning into unconnected cavities, it becomes increasingly difficult to remove gases from the mixture to avoid their reaction with the metal mixture. Upon sealing the filling particulate material 22 in an entrapped vacuum, the application of heat to the material will not result in surface oxidation of entrapped the material, preserving the metal particulate's ability to metallurgically bond together and form homogeneous solids.

Figure 2:
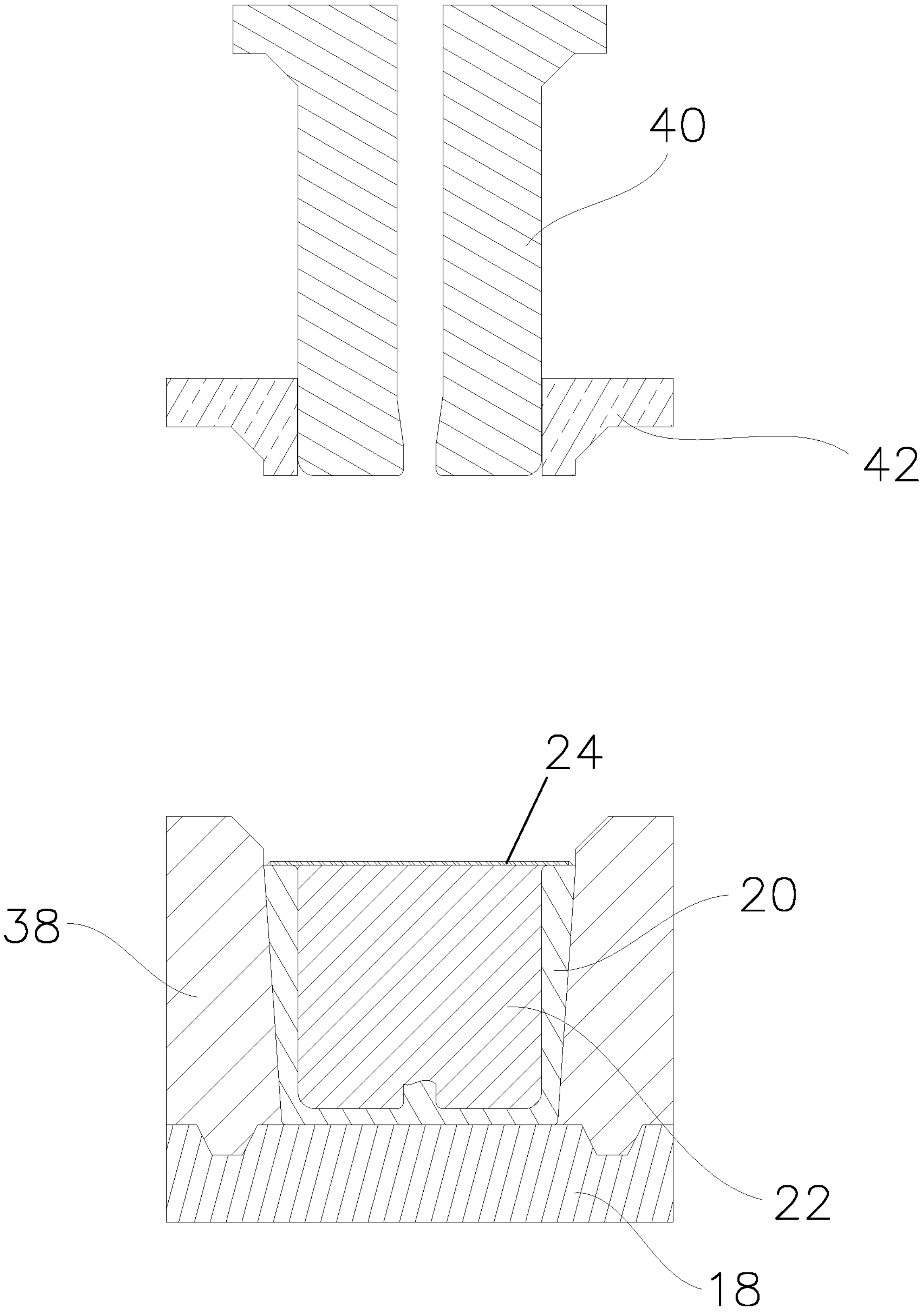
FIG. 2 is a section view of the least complex embodiment of an autogenic canister assembly placed within the matching tapered container with movable tooling retracted.

Referring to FIG. 2, the sealed container, comprising autogenic canister 20, particulate material 22, and autogenic canister lid 24, can be loaded directly into a tapered container 38 and solid container base 18 for subsequent indirect extrusion processing. The mating taper allows the autogenic canister 20 to fully seat in the corresponding taper of the tapered container 38 without material removal from the autogenic canister 38 outside diameter in order for it to fit in the next cycle. Without the tapered mating outer surface of autogenic canister 20, material removal for fit clearance into container 38 would be required, resulting in manufacturing costs and material losses. In addition to the tapered outer geometry, the wall thicknesses of the autogenic canister 20 are typically thicker than would be selected if the autogenic canister 20 were consumed and contributed to material losses. This thicker wall allows for both less delicate handling with loading and unloading equipment used with the extrusion press as well as lower incidence of wall buckling, or wrinkling seen in consolidating thin-walled canisters typical of consumable canister techniques currently employed. This mitigates the incidence of folds of the autogenic canister 20 being pulled into the extruded material and the associated losses of removing these defects. In addition to the container 38 of the indirect extrusion press, there is also an indirect extrusion ram 40, serving the purposes of a compaction and extrusion ram, and a sealing device 42. In this depiction both the indirect extrusion ram 40 and sealing device 42 are shown retracted to allow loading of the sealed canister into the container 38. The retraction and advancement of the indirect extrusion ram 40 and sealing device 42 are accomplished by some suitable press means.

Figure 3:
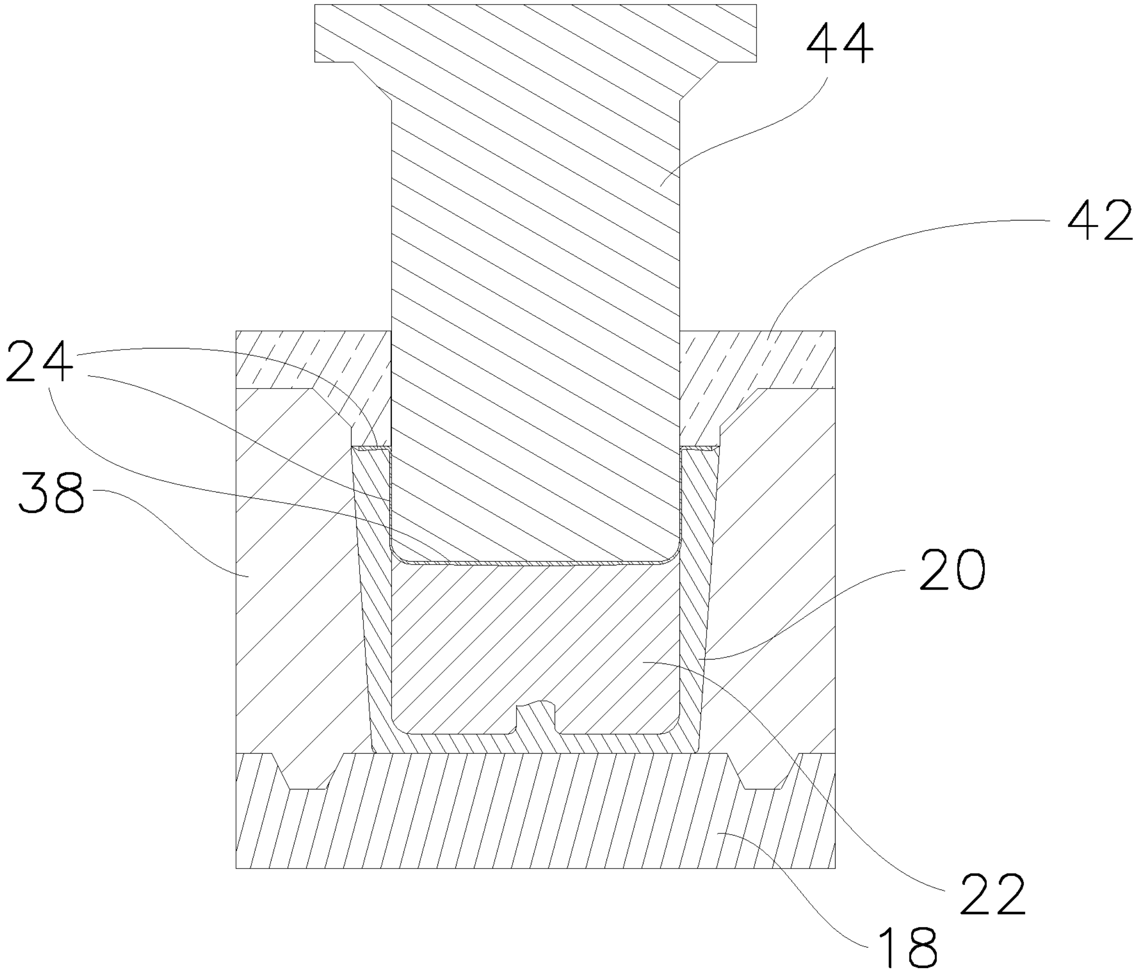
FIG. 3 is a section view of a compaction step from one embodiment of an autogenic canister assembly within a tapered container prior to subsequent extrusion step.

Referring to FIG. 3, a consolidation step is shown prior to the extrusion step to increase density of particulate material 22 to closer to that of a solid material prior to initiation of extrusion. For some material, this also ensures that voids within the particulate material 22 are sufficiently disconnected to prevent gas intrusion in the event of the autogenic canister lid 24 rupturing at some point during the subsequent extrusion step. In this compaction the autogenic canister 20 with the particulate material 22 sealed by the attached autogenic canister lid 24 is placed in a tapered container 38 having a taper matching that of the canister. A solid container base 18 is held in contact with the tapered container 38 to contain the lower portion of the container 38 under loading. The interface between the solid container base 18 and tapered container 38 can be planar, an interlocking nodule, or any suitable sealing interface. A scaling device 42 is affixed to or held against the exit of the tapered container 38 to prevent the autogenic canister 20 from flowing out between the compaction ram 44—one having no exit pathways—and the tapered container 38. In addition, the force applied to the sealing device 42 aids in securing the periphery of the autogenic canister lid 24 against the rim of the tapered container 38 instead of relying on the weld or other joining method alone. The securing of the sealing device 42 to the tapered container 38 can be achieved in a number of ways including hydraulic rams, linear actuators, locking mechanisms, or any combination thereof. A compaction ram 44 is allowed to pass through the sealing ring 42 unimpeded due to a clearance fit. The contact face of the compaction ram 44 may be flat, concave, convex, or have any suitable geometric profile deemed advantageous to consolidate or pre-shape contained material without rupturing the air-tight seal of the autogenic canister lid 24. As the compaction ram 44 compresses the autogenic canister lid 24, it causes the particulate material 22 to begin consolidating within and the autogenic canister lid 24 to draw down and stretch within the autogenic canister 20. As the autogenic lid 24 forms down, it wraps around the compaction ram 44 resulting in a diameter slightly larger than the prior inside diameter of the autogenic canister 20. This results in a drawing of the autogenic canister lid 24 into the autogenic canister 20 walls covering the substantially consolidated metal within the canister. Practically the outer radius 64 of the compaction ram 44, regardless of the remaining geometric profile, should be blunt enough to allow drawing down of the autogenic canister lid 24 instead of simply shearing through the autogenic canister lid 24 and losing vacuum around the metal particulate 22 prior to consolidation. Additionally, the thickness of the autogenic canister lid 24 should be considerably smaller than the thickness of the walls of the autogenic canister 20 but sufficient to resist rupture until sufficient consolidation is achieved prior to extrusion.

Figure 4:
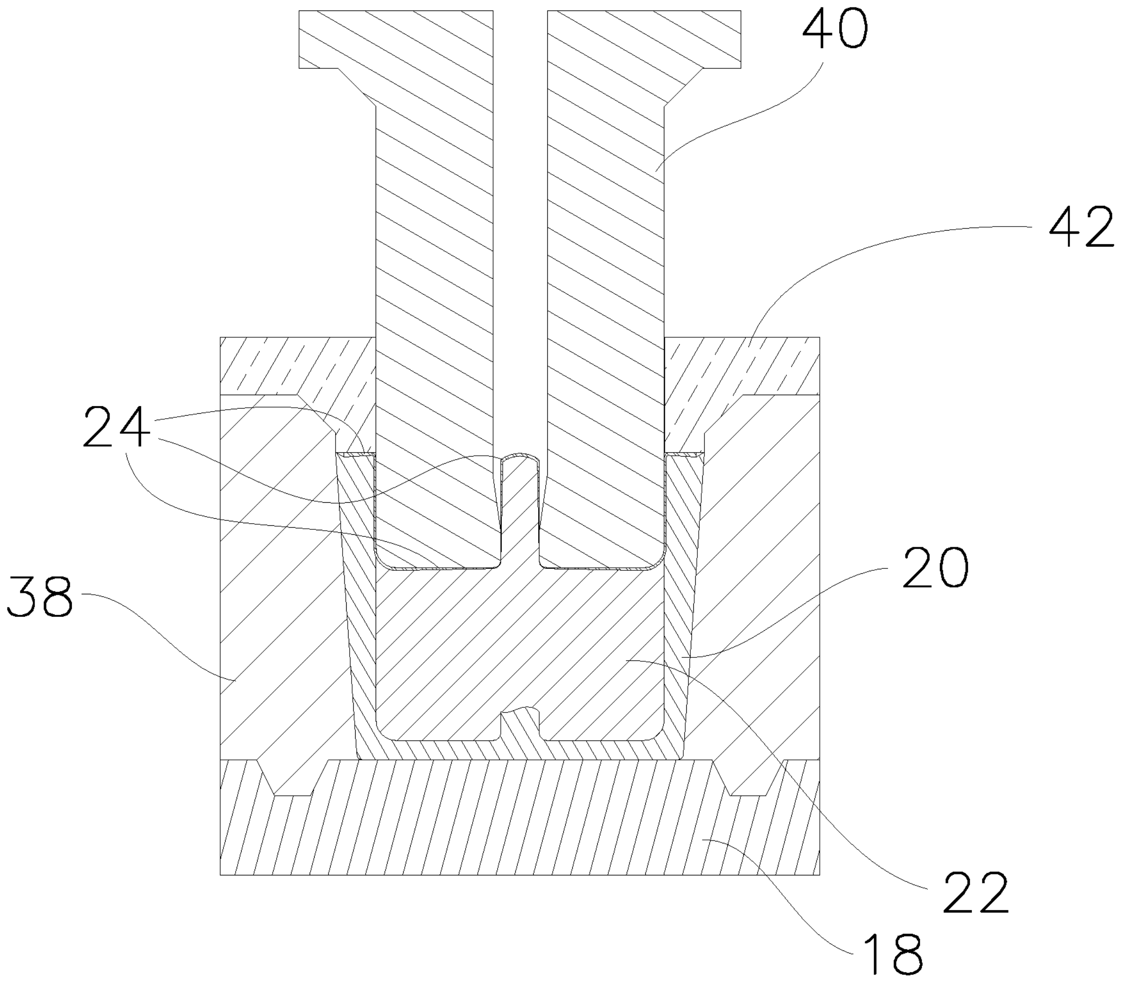
FIG. 4 is a section view of the initiation of an extrusion step of the least complex embodiment of an autogenic canister assembly.

Referring to FIG. 4, the extrusion step is shown of the filled autogenic canister 20 in the process of extrusion through the orifice of the indirect extrusion ram 40. The filled autogenic canister 20 with the particulate material 22 previously under vacuum, and the secured autogenic canister lid 24 are placed into tapered container 38. The autogenic canister 20 may have previously undergone a consolidation step depicted in FIG. 3; however, in some embodiments the non-extrusion compaction may be omitted. With the omission of prior compaction, the pressure and deformation of the extrusion process prior to initiation of extrusion flow provides the necessary condition to deliver fully dense or near fully dense material exiting the extrusion orifice. This step is accomplished by affixing the sealing device 42 to the top of the tapered container 38 and solid container base 18. The indirect extrusion ram 40 with one or more extrusion orifices is advanced into the autogenic canister 20. As before the autogenic canister lid 24 maintains a seal with the autogenic canister 20 as the indirect extrusion ram 40 deforms the now consolidated particulate material 22 in the autogenic canister 20. At a specific pressure, beholden to a number of extrusion design parameters, the particulate material 22 will begin to exit the orifice in the indirect extrusion ram 40. This pressure will be furthermore referred to as "breakthrough pressure". Once steady state is achieved, all exiting material will have undergone deformation proportional to the reduction ratio, or extrusion ratio, of the extrusion process.

Figure 5:
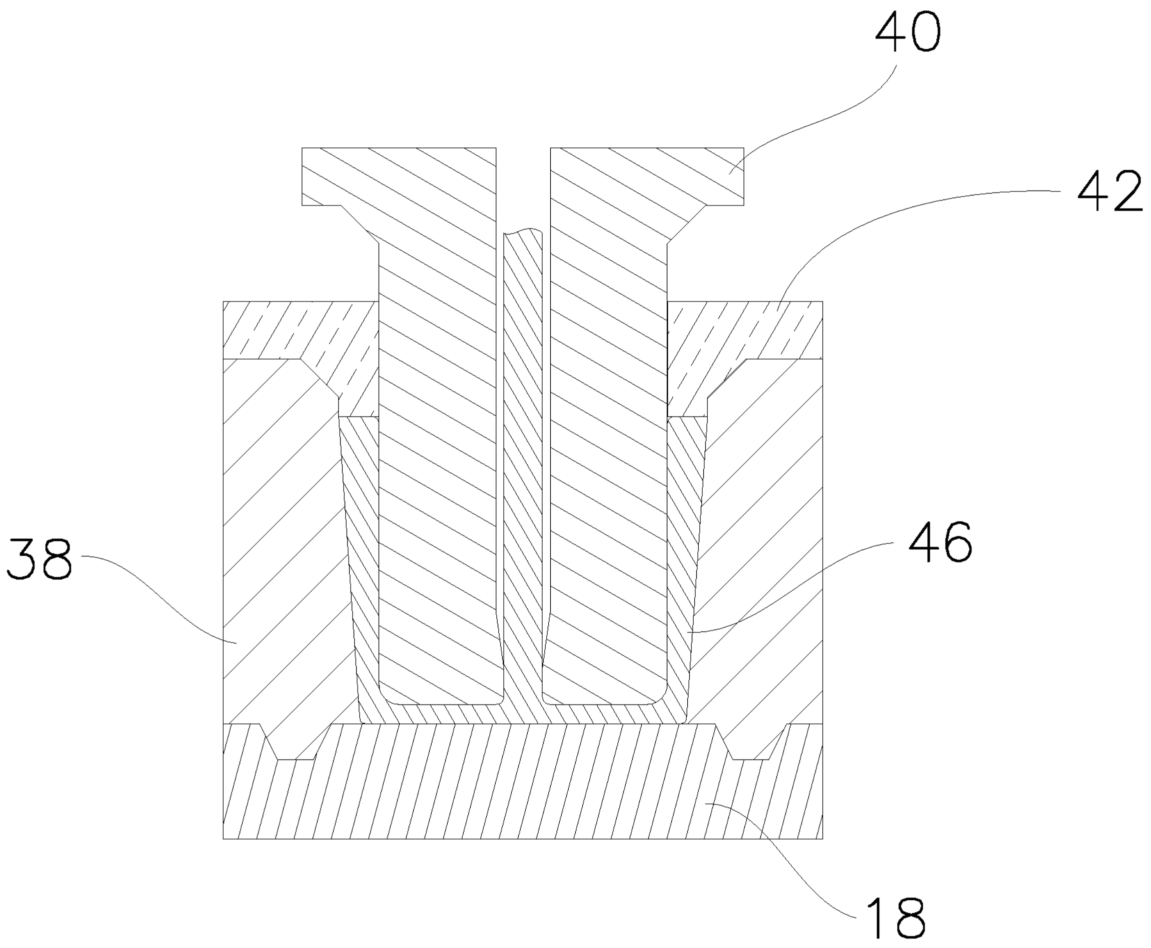
FIG. 5 is a section view of the end of an extrusion step where a remnant is formed to be used for the next iteration of autogenic canister body.

Referring to FIG. 5, the end of the extrusion process is depicted with the indirect extrusion ram 40 at the extended stroke. The resulting remaining metal between the tapered container 38, solid container base 18, sealing device 42, and indirect extrusion ram 40 forms a solid metal canister geometry with the extrusion attached, hereby named remnant 46. The resulting geometry of remnant 46, with the exception of the attached extrusion, is consistent with the starting autogenic canister 20 (from FIG. 1) for subsequent solid state deformation recycling steps. The stopping position of the extrusion ram 40 can be chosen to avoid excessive deformation of the solid container base 18 at the end of the extrusion. Since this material is re-introduced in the next cycle it can be of a thickness suitable to support a quality extrusion with no material loss penalty. Some portion of the material forming the autogenic canister lid 24 and particulate material 22 (from FIG. 1) is bound into the remnant 46 body as the high pressure and high temperature contact within the vacuum interior of the autogenic canister 20 (from FIG. 2) is ideal to facilitate mechanical or metallurgical bonding with the absence of inhibitors like oxide layers that would form outside of the vacuum. This is expected and non-detrimental in the autogenic reforming process as the chemistry of all are substantially equal and full interior metallurgical bonding is expected.

Figure 6:
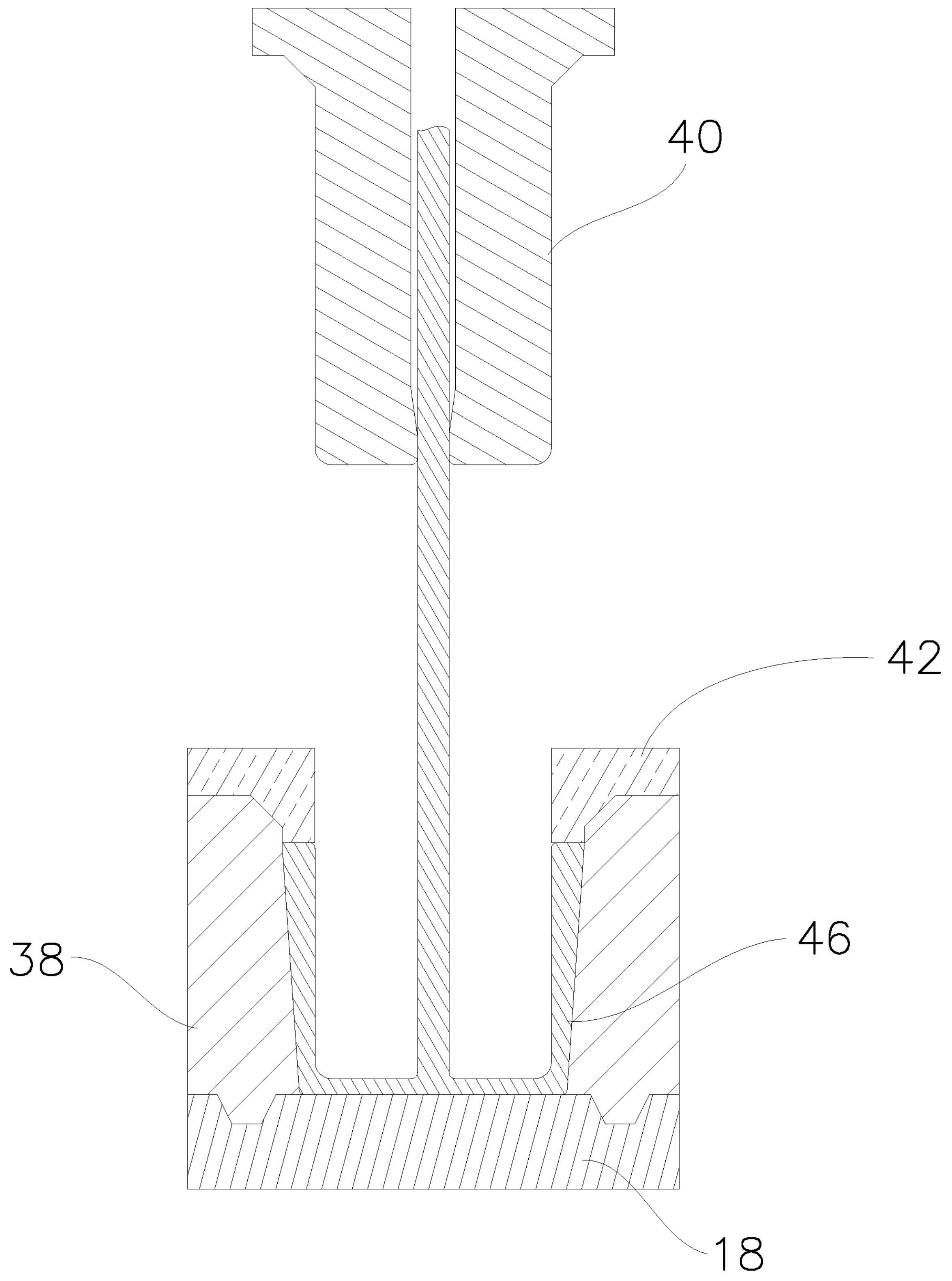
FIG. 6 is a section view of a sequence step of one embodiment following the activities of FIG. 5 where the extrusion ram has been retracted around the extruded metal.

Referring to FIG. 6, the retraction of the indirect extrusion ram 40 from the remnant 46 is shown. The sealing device 42 remains affixed against the tapered canister 38 and solid canister base 18 to provide the force necessary to slide the extrusion ram 40 from the remnant 46 and the extruded material back down the extrusion orifice. The return travel must be sufficient to remove the remnant 46 from the extrusion ram but may be more to facilitate later separation of the extrusion from the remnant 46.

Figure 7:
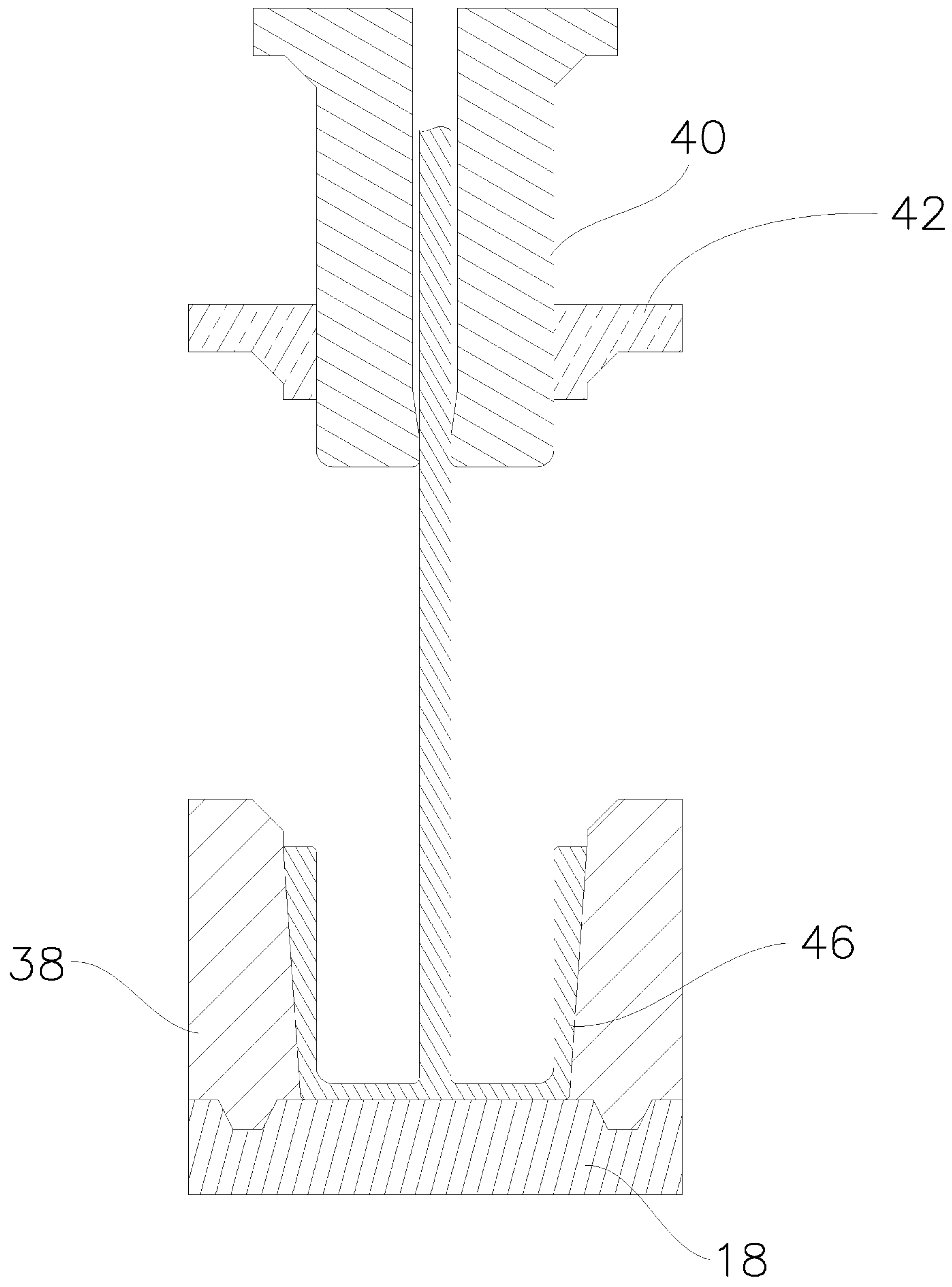
FIG. 7 is a section view of a sequence step of one embodiment following the activities of FIG. 5 where all movable tooling has been retracted.

Referring to FIG. 7, the retraction of the sealing device 42 back with the indirect extrusion ram 40 provides clearance for the removal of the remnant 46 from the tapered container 38 and solid container base 18. In some embodiments the extruded material is severed between the indirect extrusion ram 40 and the tapered container 38. In some embodiments the severed extrusion is pulled through the orifice by a suitable mechanical means (not shown) to clear the indirect extrusion ram 40. In some embodiments the extrusion ram is advanced back down toward the autogenic canister remnant 46 to the protrusion of the severed extruded material to push the extruded material through the indirect extrusion ram 40. A number of suitable means can be used clear the extrusion and autogenic canister remnant 46 from the press tooling.

Figure 8:
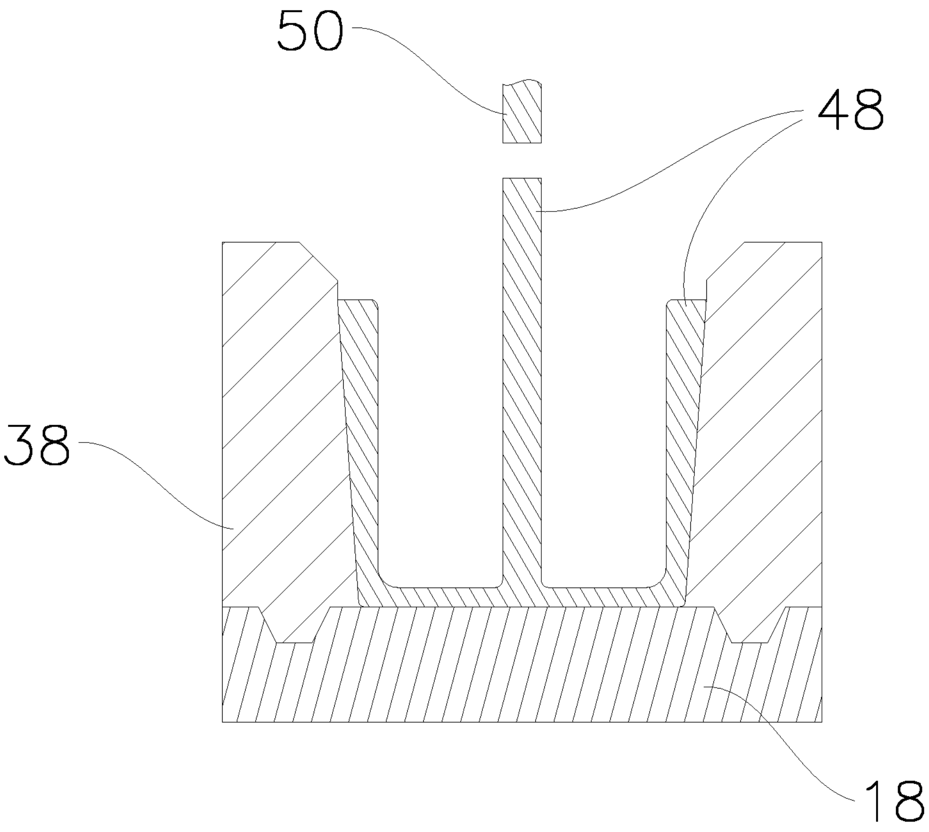
FIG. 8 is a section view of the remnant canister within the extrusion container that has been parted from the extrusion.

Referring to FIG. 8, in one embodiment the yielded extruded material 50 is mechanically separated from the newly formed autogenic canister 48 at some length from the base of 48. The range of this length can be nearly flush with the base of the newly formed autogenic canister 48 to any practical distance that still affords removal of 48 from the press. Any means for separation may be used including plasma or thermal torch, abrasive saw, mechanical shear, or any other practical means of cutting. The removal of the autogenic canister 48 from the tapered container 38 and container base 18 may be done by any suitable press means.

Figure 9:
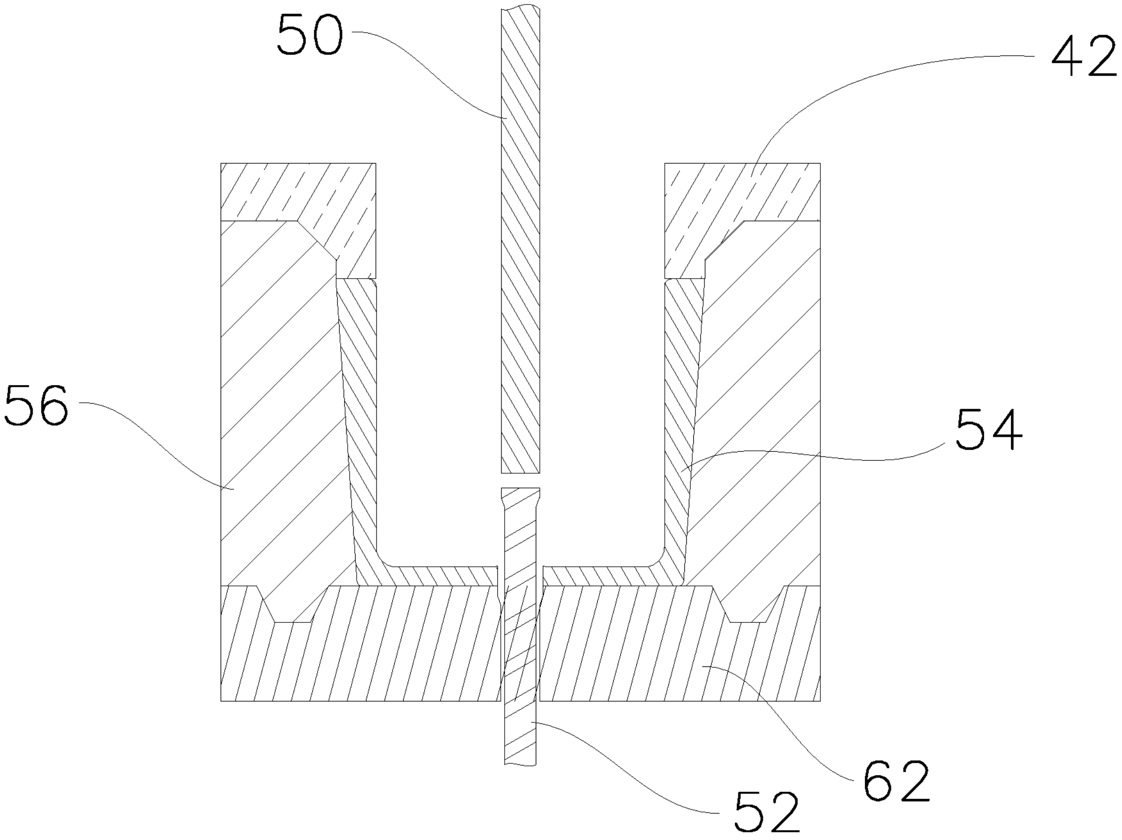
FIG. 9 is a section view of the remnant canister within the extrusion container in which the extrusion is parted from the canister body by a shear tool on the bottom side of the container.

Referring to FIG. 9, another embodiment of separating extruded material 50 using a shear tool 52 is depicted. The shear tool is integrated into a shear container base 62 that accommodates the shear tool 52 when retracted. The geometry of the tapered container 38 does not require a change for this embodiment. The sealing device 42 is shown securing the shearing canister 54 within the tapered container 38 and shearing container 56 during the shearing operation to prevent the ejection of the material. An embodiment of a shearing canister 54 is depicted that has a hole in the base where the shear separated the extrusion from the base material. Once the extruded material 50 is removed, the sealing device 42 can be retracted and the shearing canister 54 can be removed. In other embodiments the extrusion ram (not shown) may be left within the canister and the shearing tool passes through the orifice (s).

Figure 10:
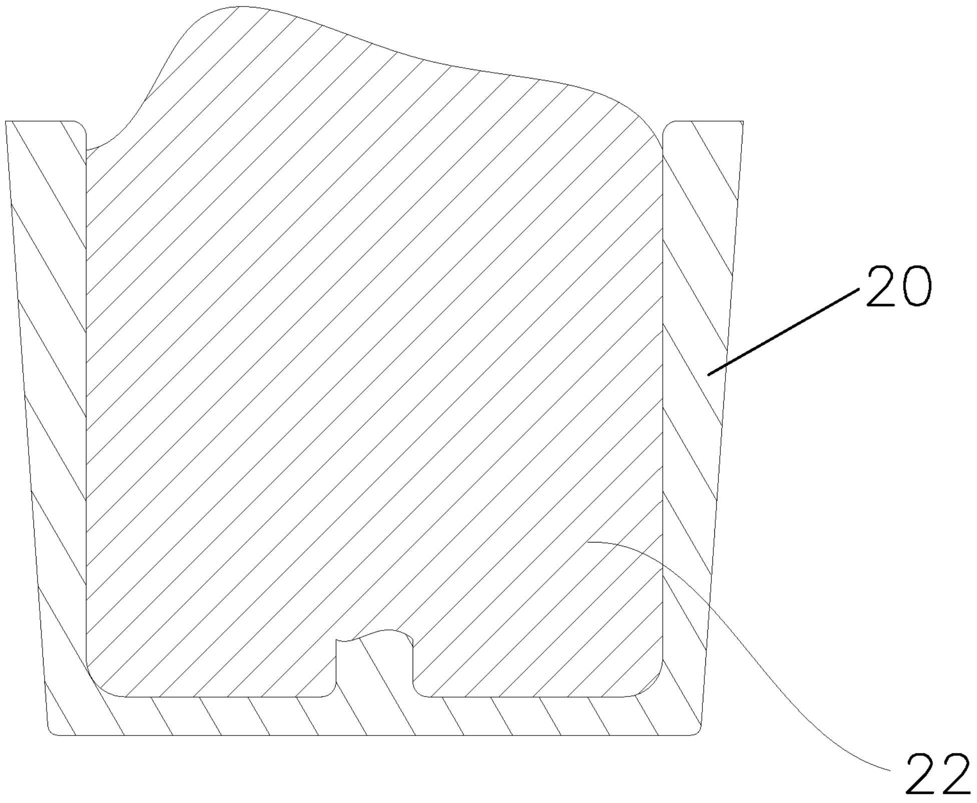
FIG. 10 is a section view of an autogenic canister that has been filled with particulate prior to being sealed.
Figure 12:
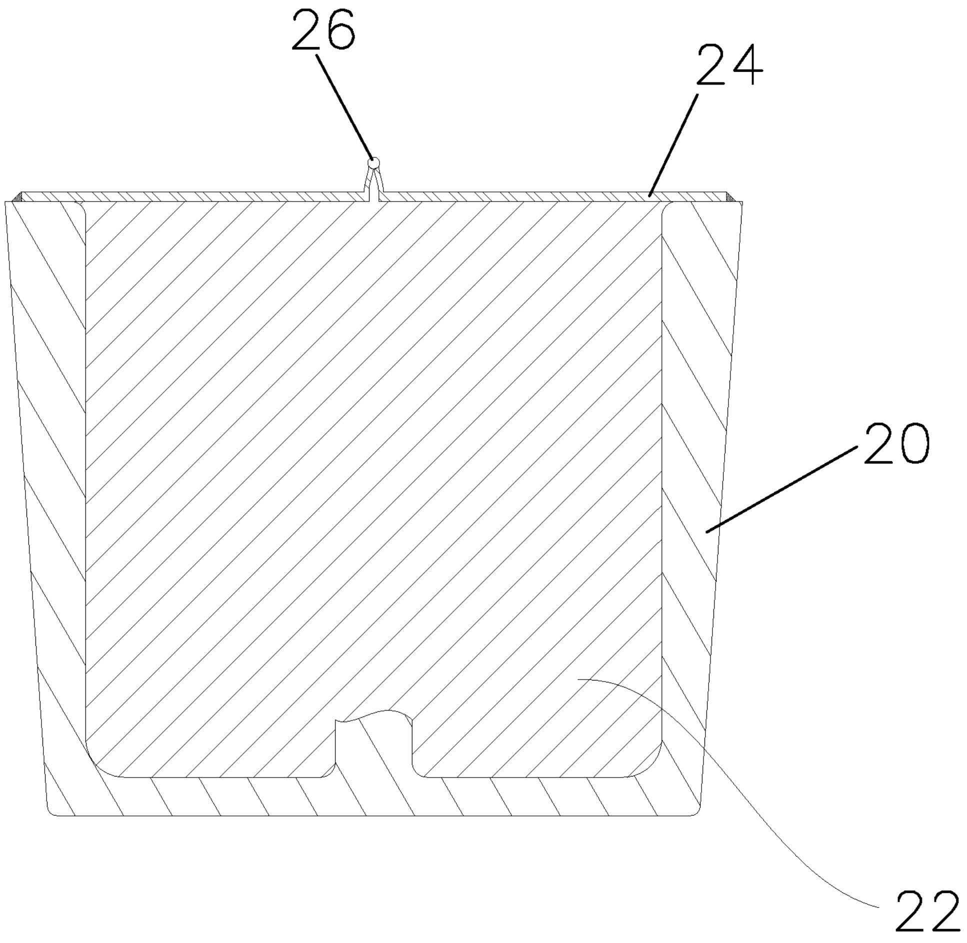
FIG. 12 is a section view of the embodiment of autogenic canister assembly depicted in FIG. 11 that has had the spout sealed, with vacuum inside, prior to heating for deformation.

Referring to FIG. 10, the image depicts an intermediate step in the process of refilling the autogenic canister 20 with particulate material 22 to be consolidated in the subsequent extrusion process. Prior to this step, the interior of the autogenic canister 20 would be cleaned of any surface contamination that may inhibit bonding with particulate material 22 or contaminate the extruded material if included in the extrusion. Any suitable method may be employed to reach cleanliness required by the specific material being recycled. The fill material 22 should be clean and largely free of any substantial oxides that will alter the chemistry or inhibit the consolidation process. During this filling process mechanical packing can be done to increase the density and the amount of particulate material 22 within the autogenic canister 20. The tapered outer diameter and base of the autogenic canister 20 will have no observed movement in the indirect extrusion process. As such they can have any practical cleanliness, oxidization level, or surface blemishes, within reason, without compromising the solid-state deformation recycling with indirect extrusion. This further adds to the robustness of the re-introduction of the autogenic canister repeatedly. The heating of the fill material 22 should be avoided when in a non-vacuum environment. The filling operation may be performed in standard atmospheric conditions for production of sealed canisters that have air evacuated through a spout as illustrated in FIG. 12. In the simplest embodiment without an evacuation spout, as shown in FIG. 1, the filling operation and/or subsequent sealing by a suitable method should be performed within a vacuum chamber to eliminate oxygen within the autogenic canister 20 that would oxidize with the fill material when being heated for extrusion. In the case where the filling is performed in atmospheric conditions, care should be taken not to over compact the particulate material 22 so as to entrap gases in a sort of closed cellular network that will lack a path to escape at a later time.

Figure 11:
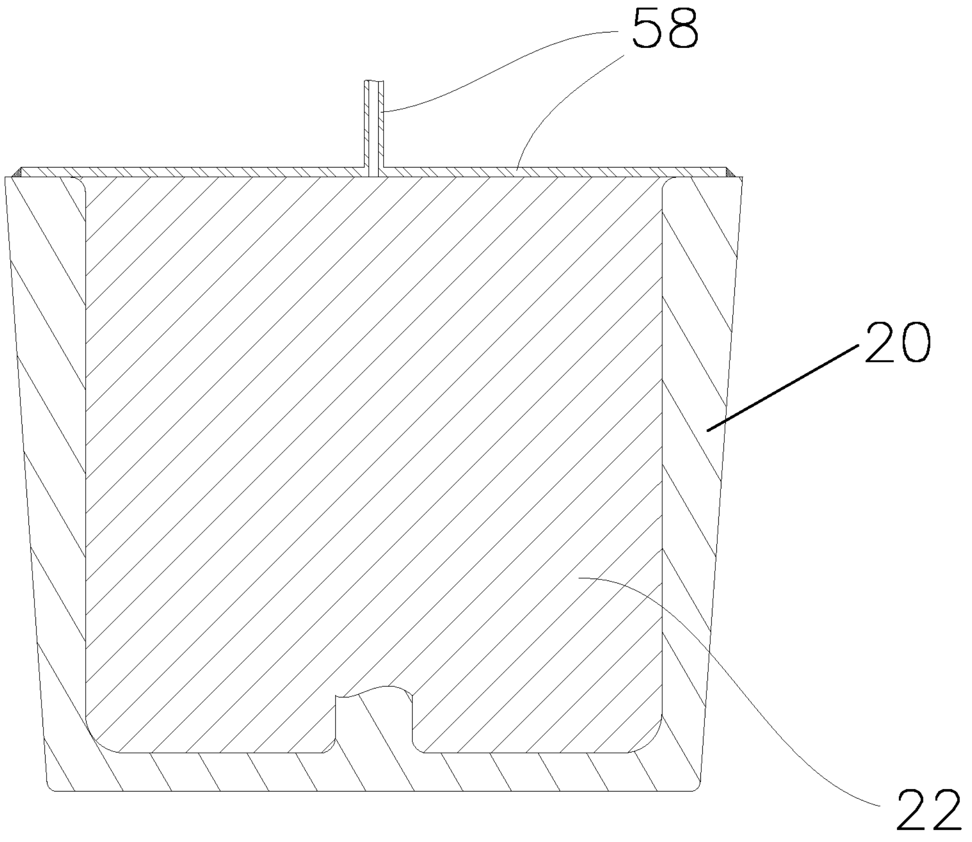
FIG. 11 is a section view of an embodiment of an autogenic canister assembly possessing a lid with a spout to generate a vacuum after the lid is attached.

Referring to FIG. 11 an evacuation lid 58—one possessing an evacuation spout-being attached to the autogenic canister 20 is depicted. Planning is done to ensure adequate particulate material 22 is contained to prevent open voids or cavities within the autogenic canister 20 as this can result in collapsing or sinking of the evacuation lid 58 upon heating. Failure to support the lid may result in loss of seal from excessive deformation by the internal vacuum pressure difference with the outside environment upon softening during the heating process. In this depiction, the evacuation lid 58 has been fully welded to the rim of the autogenic canister 20 with sufficient overlap to allow compression from the sealing device (not shown in this figure for clarity) during extrusion to assist in scaling the evacuation lid 58 to the canister rim as depicted in FIG. 3 or FIG. 4. Any suitable method of joining the periphery of the evacuation lid 58 to the autogenic canister body 20 may be employed. The sealing method employed must be fully air tight and maintain this through a full heating cycle. In this step the air around the particulate material 22 has not necessarily been evacuated until a vacuum generator is placed on the evacuation spout 26. The air is evacuated to a vacuum level required by the material being recycled. At this point, however, the spout is not sealed, and air would return to the interior of the autogenic canister 20 if the vacuum were lost from the spout. It is not anticipated that the heating of the canister in this state, prior to permanent sealing, will be within the sequence of this recycling process.

Referring to FIG. 12, the full sealing step is shown that would come after that shown in FIG. 11. In this illustration the autogenic canister 20 with particulate material 22 is sealed under vacuum by the lid with the evacuation spout 26. While the interior is maintained under vacuum, the evacuation spout 26 is crimped and welded to fully enclose the autogenic canister 20 and to prevent tramp air from contaminating the particulate material 22 during heating or extrusion. A number of methods may be employed to seal the evacuation spout 26, provided that they maintain structural integrity through the heating process to ensure that the vacuum is maintained up to the point of mechanical consolidation.

Figure 13:
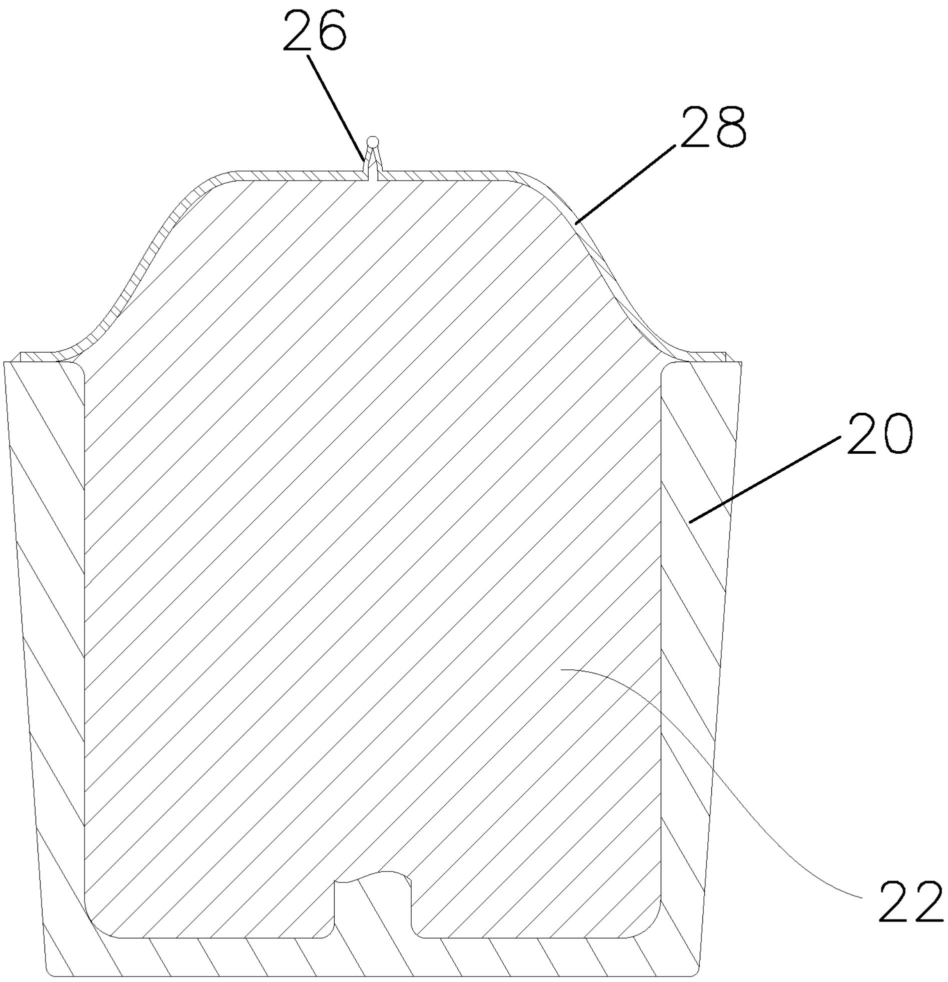
FIG. 13 is a section view of an embodiment of the autogenic canister assembly in which an outward convex shaped lid is used to seal material within.

Referring to FIG. 13, an alternative embodiment of a filled and evacuated autogenic canister 20 is shown with a convex lid geometry 28. In this embodiment of the invention a similar autogenic canister structure 20 has particulate material 22 encased beneath the convex lid 28. An evacuation spout 26 is used to place the particulate material under vacuum prior to heating and extrusion. This embodiment allows an increase of fill material that will be consolidated within a given autogenic canister structure. An alternative embodiment exists without the presence of the evacuation spout 26.

Figure 14:
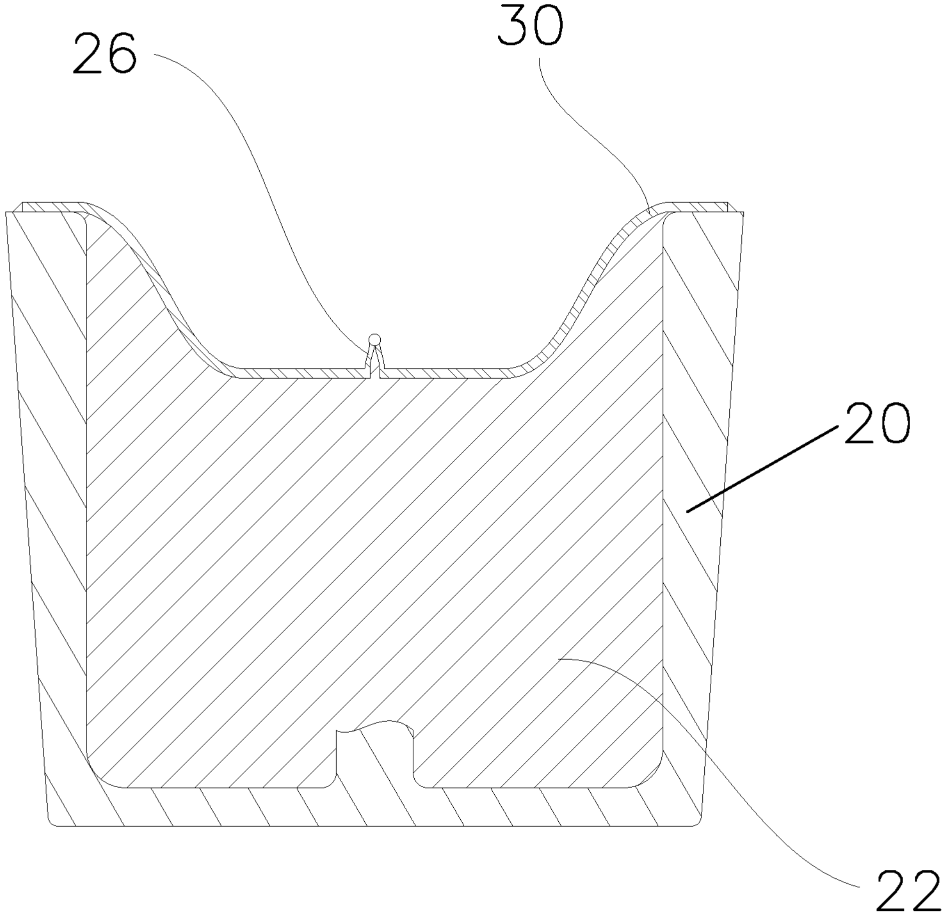
FIG. 14 is a section view of an embodiment of the autogenic canister assembly in which an inward concave shaped lid is used to seal material within.

Referring to FIG. 14, another alternative embodiment of a filled and evacuated autogenic canister 20 is shown with a concave lid geometry 30. In this embodiment of the invention a similar autogenic canister 20 has particulate material 22 encased beneath the concave lid 30. An evacuation spout 26 is used to place the particulate material 22 under vacuum prior to heating and extrusion. An alternative embodiment exists without the presence of the evacuation spout 26. An alternative embodiment may have any suitable convex, concave, or combination thereof deemed advantageous to the performance of the autogenic canister during this solid state deformation recycling process.

Figure 15:
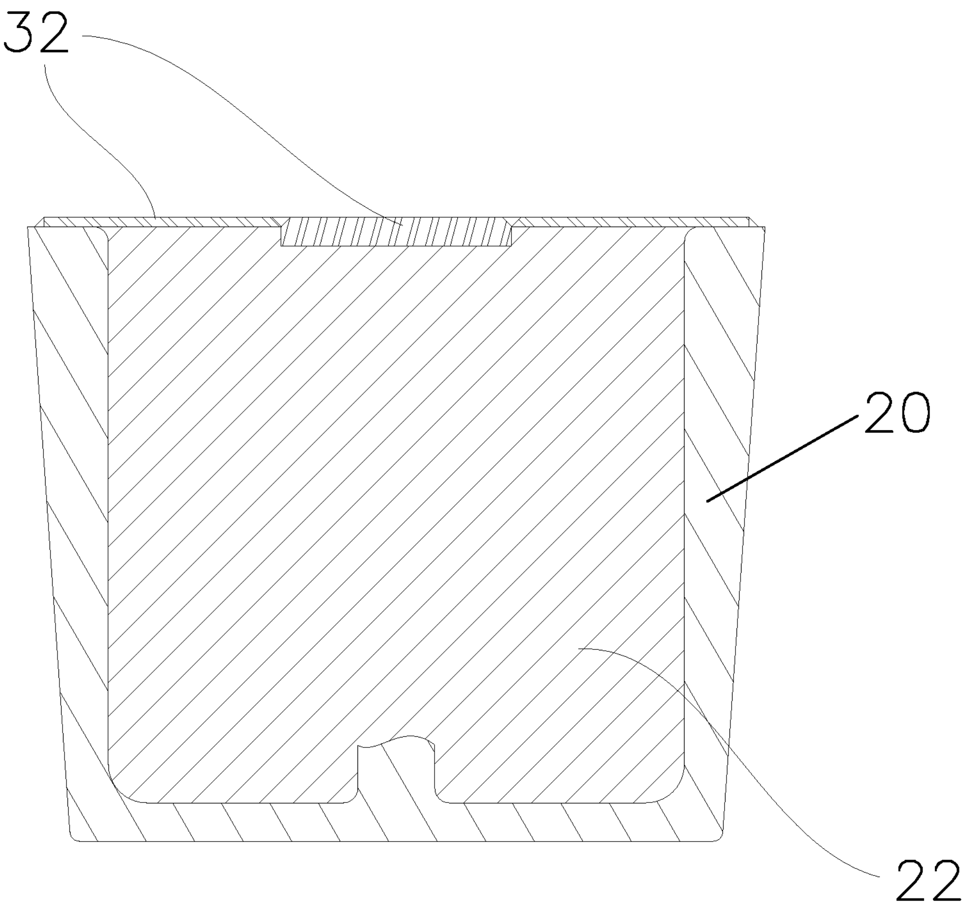
FIG. 15 is a section view of an embodiment of the autogenic canister assembly in which a lid composed of thicker and thinner plates.

Referring to FIG. 15, an embodiment of a filled and evacuated autogenic canister 20 is shown with varying thickness lid 32. In this embodiment an autogenic canister 20 is filled with evacuated metal fill material 22 for consolidation. The varying thickness lid 32 is welded to the autogenic canister 20 and is composed of plates of varying geometries and thicknesses, also joined by welding. In this embodiment the thicker and thinner lid materials are to promote varying responses to deformation. As an alternative embodiment the increased thickness may be achieve by placing additional plates within the varying thickness lid 32 as specific locations. As illustrated the placement of the thicker plate over an orifice of a ram would delay material breakthrough until a higher level of compaction and consolidation is achieved. This reduces any cropping of material from the nose of an extrusion that may contain less than fully dense material. It is worth noting that the pre-consolidation step shown in FIG. 3 would also lessen the occurrence of this stated phenomenon. This varying thickness plate 32 is drawn flat but may have any suitable combination of convex, concave, or combination constituting its geometric profile.

Figure 16:
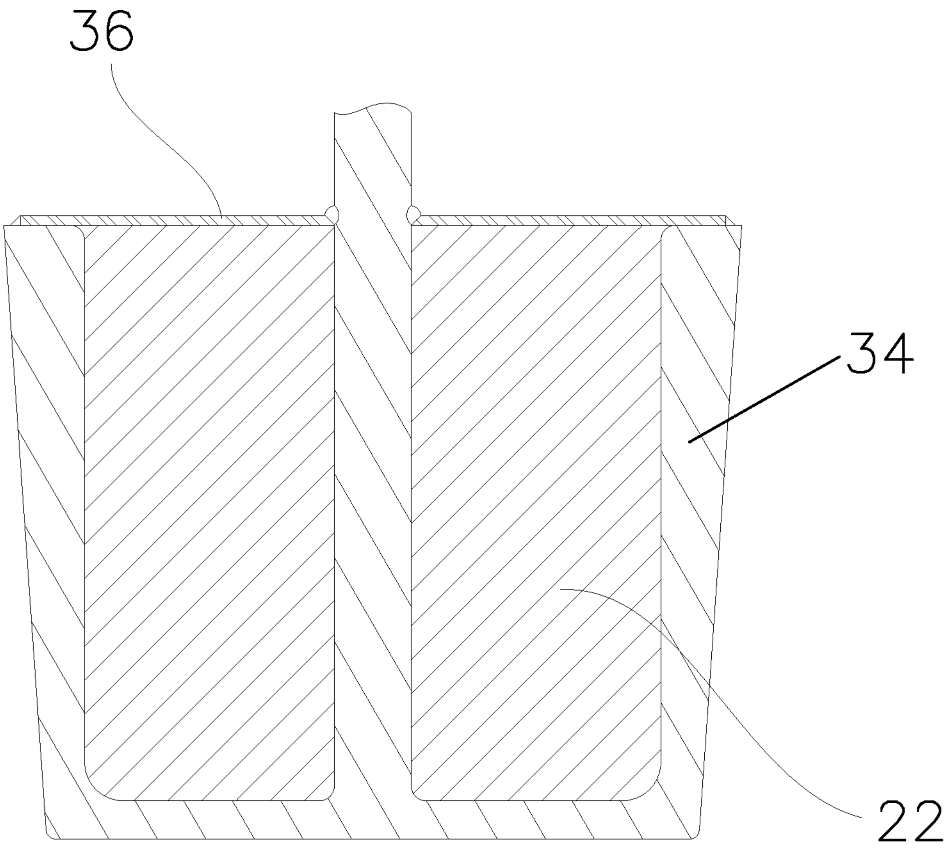
FIG. 16 is a section view of an embodiment of the autogenic canister assembly in which a lid is also joined with a protruding segment of extruded material; and, FIG. 17 is a section view an embodiment of an autogenic canister assembly preceded by the actions in FIG. 9 with a plate segment is added to seal the bottom orifice.

Referring to FIG. 16, an embodiment of a filled and evacuated autogenic canister 34 where the extruded material 50 was parted beyond the outer rim of evacuated autogenic canister 34 is depicted. In this embodiment the center welded lid 36 has a corresponding hole(s) that the extrusion remnant protrudes through. A mechanical fastening method, in this case welding, joins the center welded lid 36 to the evacuated and autogenic canister 34 at both the rim and around the extrusion remnant to encapsulate the particulate material 22 under a vacuum. The specialized welded lid 36 is drawn flat but my have any geometric profile suitable for the performance of the solid state deformation indirect extrusion recycling process.

Figure 17:
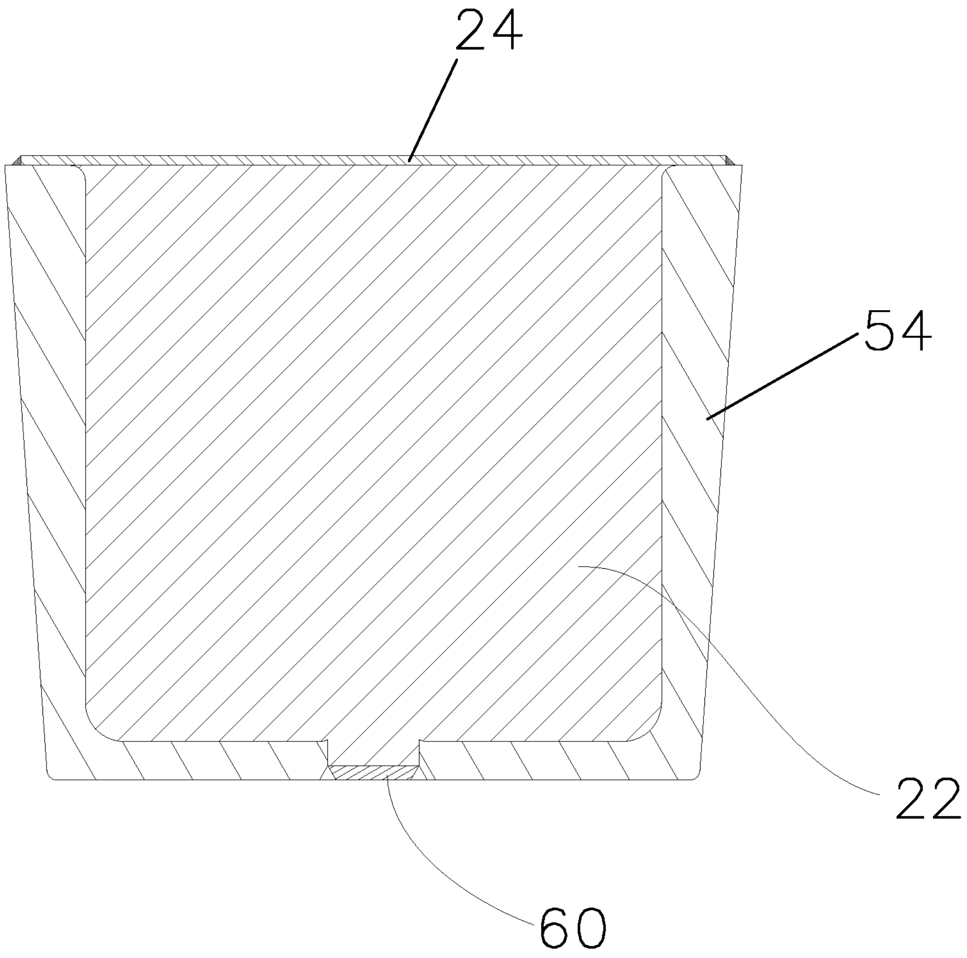

Referring to FIG. 17, an embodiment corresponding to the extrusion parting method illustrated in FIG. 9 is shown. In this embodiment this version of an autogenic shearing canister 54 has a lower seal plate 60 attached to it in order to seal the hole left by the shear tool, as illustrated in FIG. 9. Once the bottom of the autogenic shearing canister 54 has been sealed, it is filled with metal 22 and sealed under vacuum with an autogenic canister lid 24. The autogenic canister lid 24 as illustrated is a flat and lacks a spout but could be substituted by the lid variety of FIG. 12, 13, 14, or 15 and still be within the confines of this embodiment. The lower seal plate may be a manufactured plate or be a parted segment from the prior extrusion.

Example Embodiments

In order to provide a clearer illustration of the impact, novelty, and advantages of the invention, the specifics of an application are provided. This example is not to constrict the scope of the invention and is to be considered in no way limiting.

A specific example of using a variant of the autogenic canister to create wire from cleaned 17-4 stainless steel machining chips demonstrates the unique advantages of the canister in conjunction with this unique architecture of indirect extrusion.

In this specific example the dimensions of the autogenic canister interior are 2.96 inch [75.3 mm] diameter and 5.4 inch [137 mm] deep. The exterior of the autogenic canister diameter is 4.5 inch [101.6 mm] at the top with a height of 5.65" [143.5 mm]. This results in a thickness of the base of 0.25 inch [6.4 mm]. The outside diameter of this specific canister tapers at a 5-degree slope to a diameter of 3.51 inch [89.2 mm]. The significant taper allows an autogenic canister virtually unaltered from a prior extrusion run to be fully reinserted into the container. In traditional cylindrical containers, a clearance fit is generally required for re-insertion requiring material removal and losses. Additionally, significant is that the air gap in the prior art must be filled by the initial deformation of the can prior to extrusion. The lack of deformation to "fill" voids in the container means the can has more support and predictable deformation during the process.

In addition to the taper, the wall thickness of the canister is not required to be kept to a minimum, as in cases where the canister is consumed. The wall thickness is 0.77 inch [19.6 mm] at the top and 0.28" [7.0 mm] at the bottom of the canister. This is appreciable in comparison to the diameter of the canister body, but since the canister is reformed repeatedly without material losses, this is no longer detrimental to the economics of the process efficiency. This thicker wall has numerous advantages including integrity during heating, resistance during handling damage, buckling resistance, and case of ejection. A loss of vacuum either during heating or during transfer to the press will result in a loss of material as air will enter the autogenic canister and form oxides on the surface of the machining chips. This oxide will remain dispersed in the material even after deformation and compromise properties. The large rim face provides for a larger than typically allowed area for weld between the autogenic canister and the lid to ensure a strong seal. This larger area also provides a larger area for the sealing ring to apply pressure and assist in securing the periphery of the lid during consolidation. The thicker wall will resist puncture by whichever handling mechanism is employed to transfer the canister to the press. The buckling, folding, or wrinkling of the exterior canister during deformation or during ejection is a common problem facing canned extrusions. Thin-walled canisters in traditional extrusion processes will buckle and be drawn through the die with the extrusion. When this happens lubricants and oxides from the exterior surface prevent the folded material from joining to the extrusion resulting in a lap or plain of un-bonded material in the extrusion. In all cases this must be removed. The geometry of the autogenic canister avoids the causes of these defects and improves the mitigation of defects seen in prior arts.

A hemispherical lid, similar to that embodied in FIG. 13, also made of 17-4 Stainless steel would be welded to the rim of the autogenic canister within a vacuum chamber to seal the contents under vacuum. After weld is complete and an airtight seal is formed, the atmosphere is normalized in the chamber. The lid prevents air from returning to the interior of the canister, thus the vacuum is preserved. The lid and contents of the canister are supplied with each solid-state deformation recycling process. The material associated with these will either end up in the extrusion or forming a portion of the autogenic canister body. The lid structure in this case is intended to be of minimal thickness required to maintain vacuum to consolidation. In this case a 0.125" [3.2 mm] thick lid is employed to contain metal chips packed to 55% theoretical solid density under high vacuum. In this scenario the lid represents 2.7% of the metal content contained within the canister that is to be converted to wire. The underside of the lid is to be clean and free from oxides when sealed. Under high pressure and deformation, the chips, lid and autogenic canister body will join forming a homogenous metal mass within the tooling. This mass will be directed to either the extruded wire or the next autogenic canister body.

In this embodiment, stainless steel chips that have been cleaned, removed of oxide scale, and dried would be loaded into an autogenic canister made of 17-4 stainless steel. The autogenic canister would be of a comparable cleanliness on the inner surfaces so as not to contaminate the metal chips. No potential contaminants, such as extrusion lubricants used in prior arts, are to be present within the canister body. The entire sealed autogenic canister would then be heated in a gas furnace to between 1950° F. and 2150° F. prior to forging. The heated autogenic canister would be placed into a tapered container having an 5° inside diameter slope matching that of the autogenic canister outside diameter. A flat container base seals the bottom of the tapered container. Force is maintained between the tapered container and the container base with dedicated hydraulic cylinders. Prior to deformation, the sealing ring would be forced down against the rim of the autogenic canister until reaching a hard stop position on the top of the container. In this example dedicated hydraulic rams maintain constant force between the ring and the container. This fulfills many important aspects of the autogenic canister extrusion process. First this ensures that the canister is fully seated within the container and applies high pressure to secure the lid periphery to the autogenic canister rim. This force aids in the seal between the lid and autogenic canister so that if the weld ruptures the seal can be maintained by simple pressure against the mating faces. Additionally, this sealing rim allows for appreciable extrusion ratios in spite of the thicker walls of the autogenic canister. Without the sealing ring a gap would exist between the ram and the container approximately as wide as the thickness of the top rim of the container. In virtually all desirable extrusion ratios, or the ratio of extrusion ram cross sectional area to extruded cross sectional area (area of the extrusion orifice), the material in the liner would prefer to exit around the ram instead of through it. This is the path of least resistance and would compromise the ability to deliver a repeatable autogenic canister for further recycling operations. The use of the sealing ring blocks this outer area with very relatively tight clearance preventing material from trying to exit around the ram. This present ring also geometrically forms the shape of the rim for sealing the lid on the next cycle.

A fiberglass pad is placed on the lid of the canister for lubrication of the exiting material prior to engagement with the extrusion ram. With the sealing ring in place the extrusion ram applies 350 tons of force to consolidate prior to metal breakthrough and then extrude the contents of the autogenic canister. Fill material exits a single orifice in the center of the extrusion ram forming a wire of 0.296 inch [7.5 mm] diameter representing an extrusion ratio of 100:1. This represents a true strain of approximately 4.61 which is important to enable refinement of courser input stock such as machining chips. The exiting material is fully dense without microstructural remnants of the starting machine chips. The processing of material in the hot deformation temperature region prevents material defects common with high strain deformations. Following deformation, the extrusion ram is retracted and the extrusion material is severed with powered mechanical shears. The extrusion is pulled through the extrusion ram from the front of the extrusion press by a powered carriage on a linear drive. The tapered container and solid container base are separated and a block is placed between the base of the autogenic canister and the container base. Utilizing the dedicated hydraulic rams to press the tapered canister against the container base, with the block in place, results in the autogenic canister being ejected from the container. This canister geometry will be refilled, resealed, and used in subsequent recycling processes.

In this particular example considerable energy is saved by avoiding the casting and breakdown of much larger cast product down to the 0.296" diameter wire through repeated working processes on open die presses and a rolling mill(s). Though this particular example illustrates how small product such as wire can be made directly, the underlying principles and benefits are scalable to much larger end products.

What has been described above are the preferred embodiment of the claimed subject matter. These are not the only embodiments of the claimed inventive. Accordingly, the claimed subject matter is intended to embrace all such alterations, modifications and variations that fall within the spirit and scope of the claims herein.

We claim:

1. A method for solid state deformation recycling of various forms of metal particulate material 22 utilizing an autogenic canister body comprising:

a. Adding a metal particulate material 22 into the autogenic canister body 20, the autogenic canister body having an open top, tapering outer surface, and sealed or solid base;

b. Attaching a lid structure 24 to the autogenic canister body 20 and creating a vacuum in the autogenic canister body 20;

c. Heating the sealed autogenic canister 20, the attached lid structure 24, and the metal particulate material 22 contents to a temperature sufficient for hot extrusion of the metal particulate material 22;

d. Placing the heated autogenic canister 20, the attached lid structure 24, and the metal particulate material 22 into a container, the container having a tapered inside diameter portion 38 and a sealed lower portion 18, while a sealing device 42 is advanced and engages the lid structure 24;

e. Advancing an indirect extrusion ram 40 with at least one exit orifice through an opening in the sealing device 42 to deform the autogenic canister assembly without compromising vacuum until the lid 24, the canister body 20, and the contained metal particulate material 22 are bonded into a single mass and extrudes through the at least one exit orifice of the indirect extrusion ram 40;

f. Forming a metal remnant 46 at the end of the extrusion ram 40 comprised of an autogenic canister body 48 and an extruded material 50;

g. Separating the extruded material 50 from the autogenic canister body 48; and, h. Ejecting the autogenic canister body 48 from the container;

whereby the metal particulate matter is recycled in an energy efficient manner without manufacturing costs or material losses of a canister body.

2. A method according to claim 1, wherein the metal particulate material 22 undergoes a partial compaction before being placed into the autogenic canister 20.

3. A method according to claim 1, wherein the metal particulate material 22 undergoes a partial compaction after being placed into the autogenic canister 20.

4. A method according to claim 1 wherein the autogenic canister 54 previously had a breach, the breach closed by welding a plate 60 to the breach.

5. A method according to claim 1 wherein the vacuum formed within the autogenic canister is generated by drawing air or gas out through a spout on an evacuation lid 58 which is sealed prior to heating.

6. A method according to claim 1 wherein the vacuum formed within the autogenic canister is generated by welding the lid 24 onto the top of the autogenic canister body 20 while the autogenic canister 54 is within a vacuum environment.

7. A method according to claim 1 wherein the autogenic canister lid 32 is comprised of differentially thicker areas corresponding to the at least one orifice of the indirect extrusion ram 40.

8. A method according to claim 1 wherein the canister lid has a shape from selected from the group consisting of a concave canister lid 28, a convex canister lid 30, and a combination of geometric profiles.

9. A method for solid state deformation recycling of various forms of metal particulate material utilizing an autogenic canister comprising:

a. Adding a metal particulate material 22 into the autogenic canister body 20, the autogenic canister body having an open top, tapering outer surface, and sealed or solid base;

b. Attaching a lid structure 24 to the autogenic canister body 20 and creating a vacuum in the autogenic canister body 20;

c. Heating the sealed autogenic canister 20, the attached lid structure 24, and the metal particulate material 22 contents to a temperature sufficient for hot extrusion of the metal particulate material 22;

d. Placing the heated autogenic canister 20, the attached lid structure 24, and the metal particulate material 22 into a container, the container having a tapered inside diameter portion 38 and a sealed lower portion 18, while a sealing device 42 is advanced and engages the lid structure 24;

e. Advancing a solid faced compaction ram 44 through the sealing device 42 to deform the autogenic canister 20 under vacuum until the lid structure 24, the canister body 20, and the metal particulate material 22 are bonded into a single mass, f. Advancing an indirect extrusion ram 40 with at least one exit orifice through an opening in the sealing device 42 to deform the autogenic canister assembly without compromising vacuum until the lid 24, the canister body 20, and the contained metal particulate material 22 are bonded into a single mass and extrudes through the at least one exit orifice of the indirect extrusion ram 40;

g. Forming a metal remnant 46 at the end of the extrusion ram 40 comprised of an autogenic canister body 48 and an extruded material 50;

h. Separating the extruded material 50 from the autogenic canister body 48; and, i. Ejecting the autogenic canister body 48 from the container;

Whereby extrusion consolidation of metal particulate material of various forms is recycled to effectively fully dense and wrought microstructure in an energy efficient manner without manufacturing costs or material losses of a canister body.

10. A method according to claim 9 wherein the particulate material 22 undergoes compaction before being placed in the autogenic canister 20 by some means of compression.

11. A method according to claim 9 wherein the particulate material 22 undergoes compaction after being placed in the autogenic canister 20 by some means of compression.

12. A method according to claim 9 wherein the autogenic canister 54 previously had a breach, the breach closed by welding a plate 60 to the breach.

13. A method according to claim 9 wherein vacuum is formed within the autogenic canister by drawing air or gas out through a spout on an evacuation lid 58 which is sealed 26 prior to heating.

14. A method according to claim 9 wherein vacuum is formed within the autogenic canister by welding the lid 24 onto the top of the autogenic canister body 20 while the entire assembly is within a vacuum environment.

15. A method according to claim 9 wherein the canister lid has a shape from selected from the group consisting of a concave canister lid 28, a convex canister lid 30, and a combination of geometric profiles.

* * * * *